(12) United States Patent
Hirota et al.

(10) Patent No.: US 11,711,144 B2
(45) Date of Patent: Jul. 25, 2023

(54) OPTICAL FIBER DISPLAY SYSTEM AND OPTICAL FIBER SWITCHING METHOD

(71) Applicant: NIPPON TELEGRAPH AND TELEPHONE CORPORATION, Tokyo (JP)

(72) Inventors: Hidenobu Hirota, Musashino (JP); Hiroyuki Iida, Musashino (JP); Takui Uematsu, Musashino (JP); Naotsugu Ambe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 108 days.

(21) Appl. No.: 17/600,537

(22) PCT Filed: Mar. 19, 2020

(86) PCT No.: PCT/JP2020/012212
§ 371 (c)(1),
(2) Date: Sep. 30, 2021

(87) PCT Pub. No.: WO2020/203333
PCT Pub. Date: Oct. 8, 2020

(65) Prior Publication Data
US 2022/0166502 A1 May 26, 2022

(30) Foreign Application Priority Data
Apr. 3, 2019 (JP) .................. 2019-071646

(51) Int. Cl.
*H04B 10/079* (2013.01)
*G02B 6/28* (2006.01)

(52) U.S. Cl.
CPC ....... *H04B 10/0795* (2013.01); *G02B 6/2852* (2013.01)

(58) Field of Classification Search
CPC .................................................. H04B 10/0795
See application file for complete search history.

(56) References Cited

U.S. PATENT DOCUMENTS

| 10,790,908 B1 * | 9/2020 | Xia ........................ H04B 10/50 |
| 2005/0041902 A1 * | 2/2005 | Frigo ..................... G01M 11/30 |
| | | 385/1 |

(Continued)

OTHER PUBLICATIONS

Hidenobu Hirota et al., Optical Cable Changeover Tool With Light Injection and Detection Technology, Journal of Lightwave Technology, vol. 34, No. 14, 2016, pp. 3379-3388.

(Continued)

*Primary Examiner* — Shi K Li
(74) *Attorney, Agent, or Firm* — Harness, Dickey & Pierce, P.L.C.

(57) ABSTRACT

There are provided an optical fiber display system and an optical fiber changeover method each enabling an efficient optical fiber changeover work. The optical fiber display system according to the present invention includes a plurality of core wire identification terminals 101. Each of the core wire identification terminals 101 includes: bent part formation units 11 configured to form a bent part at an optional position of an optical fiber 50 and to leak optical signals propagating through the optical fiber 50 from the bent part; analysis units 12 configured to acquire identification numbers of communication apparatuses (51 and 52) included in the leaked optical signals, the communication apparatuses (51 and 52) being connected to respective ends of the optical fiber 50; a communication unit 13 configured to inquire of a database 201 storing relationship between the optical fiber and the communication apparatuses about the acquired identification numbers of the communication apparatuses, and to receive an identification number of the optical fiber 50 corresponding to the acquired identification numbers of the (Continued)

communication apparatuses, from the database 201; and a display unit 14 configured to display the acquired identification numbers of the communication.

8 Claims, 22 Drawing Sheets

(56) References Cited

U.S. PATENT DOCUMENTS

| | | | | |
|---|---|---|---|---|
| 2011/0217004 A1* | 9/2011 | Niimi | ............ | G02B 6/2852 |
| | | | | 385/32 |
| 2014/0307251 A1* | 10/2014 | Liang | ............ | G01M 11/088 |
| | | | | 356/73.1 |

OTHER PUBLICATIONS

Hisashi Izumita et al., Group 5 (communication / broadcasting), vol. 2 (optical access line / transmission technology), Chapter 6 Optical line maintenance technology, Institute of Electronics, Information and Communication Engineers "Knowledge Base", Jun. 26, 2018.

\* cited by examiner

OPTICAL FIBER DISPLAY SYSTEM AND OPTICAL FIBER SWITCHING METHOD

CROSS-REFERENCE TO RELATED APPLICATIONS

This application is a 371 U.S. National Phase of International Application No. PCT/JP2020/012212 filed on Mar. 19, 2020, which claims priority to Japanese Application No. 2019-071646 filed on Mar. 4, 2019. The entire disclosures of the above applications are incorporated herein by reference.

TECHNICAL FIELD

The present disclosure relates to an optical fiber display system used for an optical cable changeover work, and to an optical fiber changeover method.

BACKGROUND ART

In an optical access network, facilities illustrated in FIG. 1 are provided to provide service of the Internet and telephone to a user. An optical line terminal (OLT) that is a communication apparatus is installed in a communication building, and an optical network unit (ONU) is installed in a user's home. The OLT and the ONU are connected through an IDM, an optical cable, and a splitter. The OLT outputs communication light having wavelengths of 1490 nm and 1550 nm, and the ONU outputs communication light having a wavelength of 1310 nm. As a result, the OLT and the ONU recognize each other to provide high-speed broadband service such as the Internet and the telephone to the user.

Other than the communication facilities including the optical cable, social infrastructure facilities such as roads, electricity, gas, water, and railway are constructed. In a case where the optical cable inhibits construction of the social infrastructure facilities, it is necessary to change a route of the optical cable in advance. FIG. 2 to FIG. 4 illustrate the change of the route. The optical cable fiber providing the current service is disconnected at two positions, and is reconnected to a new optical cable fiber. The optical fiber is disconnected at the two positions and is reconnected to the new cable in the above-described manner, to bypass an area inhibiting the construction (Non-Patent literature 1).

CITATION LIST

Non-Patent Literature

Non-Patent Literature 1: H. Hirota, T. Kawano, M. Shinpo, K. Noto, T. Uematsu, N. Honda, T. Kiyokura, and T. Manabe, "Optical Cable Changeover Tool With Light Injection and Detection Technology," Journal of Lightwave Technology, Vol. 34, No. 14, pp. 3379-3388, 2016.

Non-Patent Literature 2: H. Izumida, T. Kurashima, Optical Time Domain Reflector (OTDR), Knowledge Base, The Institute of Electronics, Information and Communication Engineers, Group 5, Part 2, Chapter 6, 6-1-2, 2017.

SUMMARY OF THE INVENTION

Technical Problem

A large number of optical fibers are included in the optical fiber cable. Disconnection of an optical cable and replacement with a new route indicate that the optical fiber in the cable is selected without making a mistake, and a worker connects an optical fiber in a new optical cable.

If an incorrect optical fiber is erroneously disconnected, service cannot be provided. If a newly installed optical fiber is erroneously connected, the service cannot be provided. Therefore, the changeover work is progressed while each of the optical fibers is monitored. FIG. 2 illustrates the work.

A worker 1 is arranged in the communication building. The worker 1 monitors the whole of the construction. Further, the worker 1 performs a pulse test (optical time domain reflectometer, referred to as OTDR). In the pulse test, an OTDR test device installed in the communication building outputs communication light having wavelength of 1650 nm, and a state of the optical fiber extending from the communication building is monitored in real time.

FIG. 2 to FIG. 9 illustrate outline of a procedure of the OTDR test. FIG. 2 to FIG. 4 illustrate whole steps, and FIG. 5 to FIG. 9 illustrate change of a waveform of the OTDR measurement in the steps. First, the worker 1 performs the OTDR test in a state illustrated in FIG. 2. In this test, the communication light having the wavelength of 1650 nm is caused to propagate through the optical fiber from the communication building (Non-Patent Literature 2). FIG. 5 illustrates a waveform on a OTDR measurement screen.

Subsequently, a worker 3 confirms arrival of the light having the test wavelength, and a worker 2 then similarly confirms arrival of the light having the test wavelength (FIG. 2). At this time, the three works are in cooperation with one another through mobile phones or the like. Thereafter, the worker 3 disconnects the optical fiber (FIG. 3). When the optical fiber is disconnected, the waveform is changed on the OTDR measurement screen as illustrated in FIG. 6, and the worker 1 in the communication building confirms that the worker 3 has disconnect the optical fiber. Next, the worker 2 disconnects the optical fiber (FIG. 2), and the waveform is changed on the OTDR measurement screen (FIG. 7). The workers thus specify and disconnect the optical fiber without making a mistake.

In connection of the newly installed optical fiber, the worker 2 first connects the newly installed optical fiber (FIG. 4), and the worker 1 confirms change of the waveform on the OTDR measurement screen (FIG. 8). Thereafter, the worker 3 connects the newly installed optical fiber (FIG. 4), and the worker 1 similarly confirms change of the waveform on the OTDR measurement screen (FIG. 9). Finally, the worker 1 confirms communication between the OLT and the ONU. The changeover of the optical fiber is thus completed.

The construction to change over the currently installed optical fiber to the newly installed optical fiber is performed outside the communication building. The worker 1 performs the confirmation work and issues instructions from the communication building, and the workers 2 and 3 perform the construction while communicating with each other. As described above, the existing optical fiber changeover work is performed while the workers communicate with each other, which is inefficient.

Therefore, to solve the above-described issues, an object of the present invention is to provide an optical fiber display system and an optical fiber changeover method each enabling an efficient optical fiber changeover work.

Means for Solving the Problem

To achieve the above-described object, in the present invention, a terminal that enables a confirmation work for changeover of the optical fiber on a construction site is used, and no worker is arranged in the communication building.

More specifically, an optical fiber display system according to the present invention is an optical fiber display system including a plurality of core wire identification terminals. Each of the core wire identification terminals includes: bent part formation units configured to form a bent part at an optional position of an optical fiber and to leak optical signals propagating through the optical fiber from the bent part; analysis units configured to acquire identification numbers of communication apparatuses included in the leaked optical signals, the communication apparatuses being connected to respective ends of the optical fiber; a communication unit configured to inquire of a database storing relationship between the optical fiber and the communication apparatuses about the acquired identification numbers of the communication apparatuses, and to receive an identification number of the optical fiber corresponding to the acquired identification numbers of the communication apparatuses, from the database; and a display unit configured to display the acquired identification numbers of the communication apparatuses and the received identification number of the optical fiber.

In the optical fiber display system, a worker leaks the optical signals from the communication apparatuses from the optical fiber at one disconnection position of the optical fiber by using the core wire identification terminal, and confirms the identification numbers such as MAC addresses from the optical signals. Confirmation of the identification numbers enables specification of the optical fiber to be changed over without arranging the worker in the communication building. Further, at the other disconnection position of the optical fiber, a worker similarly confirms the identification numbers such as the MAC addresses by using the core wire identification terminal. These information is mutually shared by the workers, which makes it possible to perform specification, disconnection, and connection of the optical fiber to be changed over without arranging the worker in the communication building.

A specific optical fiber changeover method is an optical fiber changeover method of changing over a partial section of an optical fiber from an existing fiber to a newly installed optical fiber in an optical access network in which an optical line terminal (OLT) and an optical network unit (ONU) are connected by the optical fiber. The optical fiber changeover method includes: a specification step of specifying the existing optical fiber to be changed over, by acquiring identification numbers of the OLT and the ONU as communication apparatuses by using core wire identification terminals at both ends of the partial section, inquiring of a database storing relationship among the optical fiber, the OLT, and the ONU about the acquired identification numbers of the communication apparatuses, and confirming, in the core wire identification terminals, that an identification number of the optical fiber corresponding to the acquired identification numbers of the communication apparatuses is coincident with an identification number of the existing optical fiber to be changed over; a disconnection step of disconnecting the existing optical fiber by first disconnecting an end of the existing optical fiber on the ONU side out of both ends of the partial section, and disconnecting an end of the existing optical fiber on the OLT side after the identification number of the ONU as the communication apparatus is hidden in the core wire identification terminal on the OLT side; an information update step of updating information in the database by rewriting the identification number of the optical fiber in the database from the identification number of the existing optical fiber to an identification number of the newly installed optical fiber; a connection step of connecting the newly installed optical fiber by first connecting an end of the newly installed optical fiber on the OLT side out of both ends of the partial section, and connecting an end of the newly installed optical fiber on the ONU side after the identification number of the OLT as the communication apparatus is displayed on the core wire identification terminal on the OLT side; and a confirmation step performed after the newly installed optical fiber is connected, by acquiring the identification numbers of the OLT and the ONU as the communication apparatuses by using the core wire identification terminals at both ends of the partial section, inquiring of the database about the acquired identification numbers of the communication apparatuses, and confirming, in the core wire identification terminals, the acquired identification numbers of the communication apparatuses and the identification number of the optical fiber corresponding to the acquired identification numbers of the communication apparatuses.

Accordingly, the present invention can provide the optical fiber display system and the optical fiber changeover method each enabling an efficient optical fiber changeover work.

Further, each of the core wire identification terminals of the optical fiber display system according to the present invention further includes a positional information acquisition unit configured to grasp a position of an own terminal. The communication units of the respective core wire identification terminals mutually notify the identification numbers of the communication apparatuses, the identification number of the optical fiber, and the grasped own position. The display unit of each of the core wire identification terminals also displays the identification numbers of the communication apparatuses, the identification number of the optical fiber, and the position of another core wire identification terminal that are notified from the other core wire identification terminal.

Further, in a case where the leaked optical signals disappear, the analysis units of each of the core wire identification terminals included in the optical fiber display system according to the present invention cause the display unit to hide the identification numbers of the communication apparatuses. In a case where the disappeared optical signals are leaked again, the analysis units cause the communication unit to perform inquiry again, cause the communication unit to receive the identification number of the optical fiber corresponding to newly acquired identification numbers of the communication apparatuses, from the database, and cause the display unit to display the newly acquired identification numbers of the communication apparatuses and the received identification number of the optical fiber.

The analysis units of each of the core wire identification terminals of the optical fiber display system according to the present invention may acquire authentication information transmitted from the communication apparatuses, included in the leaked optical signals. The display unit may display the acquired authentication information together with the acquired identification numbers of the communication apparatuses and the received identification number of the optical fiber. In the confirmation step, it is possible to acquire the authentication information from the ONU and to confirm the authentication information in the core wire identification terminals.

Further, the communication unit of each of the core wire identification terminals included in the optical fiber display system according to the present invention preferably transmit, to the database, a correction signal to correct the relationship between the optical fiber and the communication apparatuses, stored in the database. A registration step of registering information on a position where the existing optical fiber is disconnected in the disconnection step and the identification numbers and the authentication information on the communication apparatuses acquired in the confirmation step, in the database, can be further performed.

Effects of the Invention

The present invention can provide the optical fiber display system and the optical fiber changeover method each enabling the efficient optical fiber changeover work.

DESCRIPTION OF EMBODIMENTS

Figure 1:
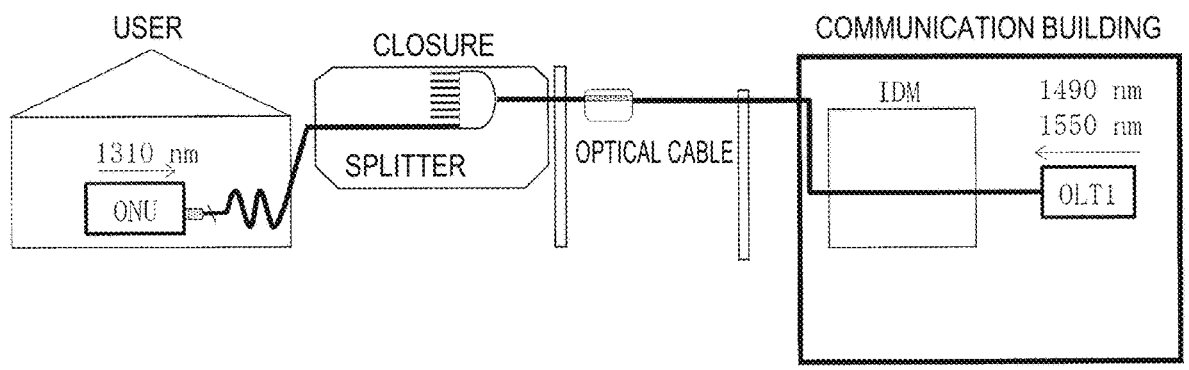
FIG. 1 is a diagram illustrating an optical access network.

Embodiments of the present invention are described with reference to accompanying drawings. The embodiments described below are implementation examples of the present invention, and the present invention is not limited to the following embodiments. Note that, in the present specification and the drawings, components denoted by the same reference numerals indicate the same components.

Embodiment 1

Figure 2:
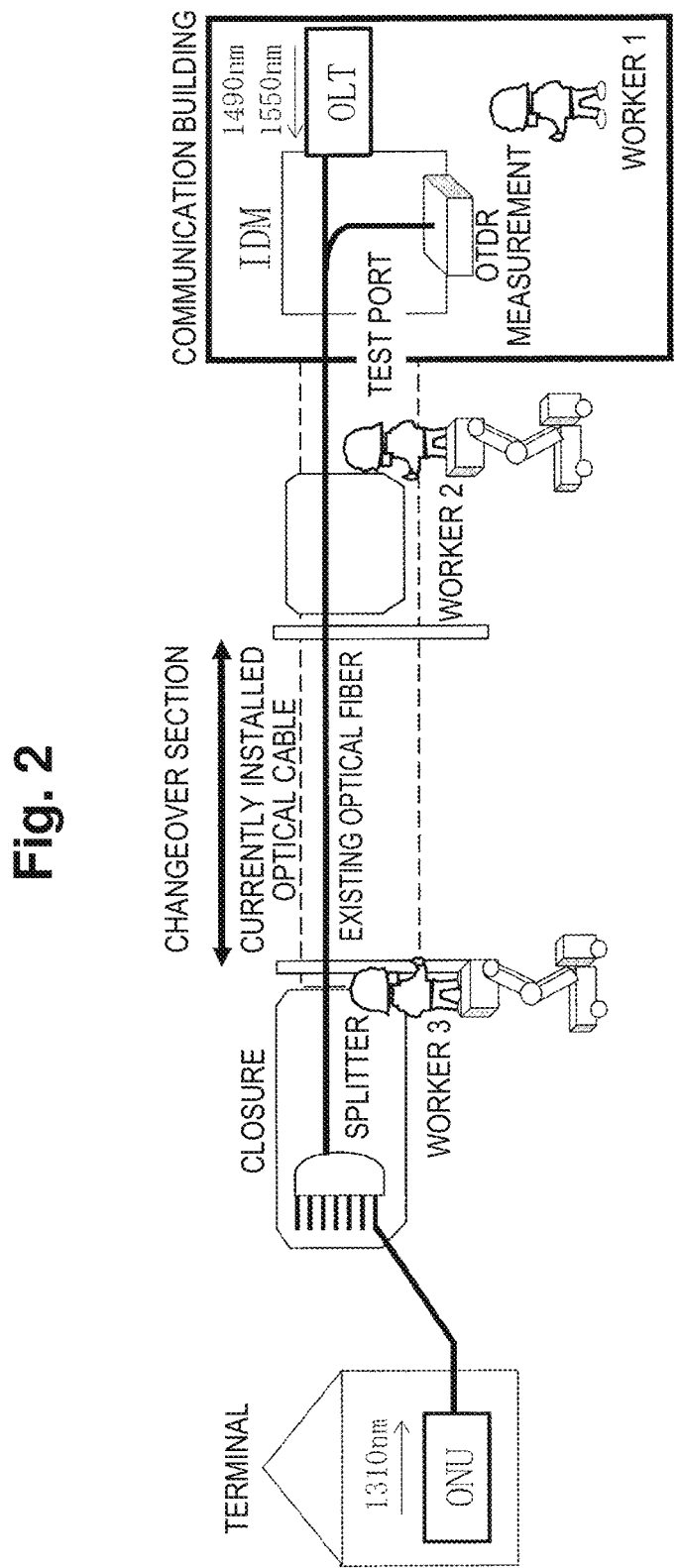
FIG. 2 is a diagram illustrating optical fiber changeover construction.
Figure 3:
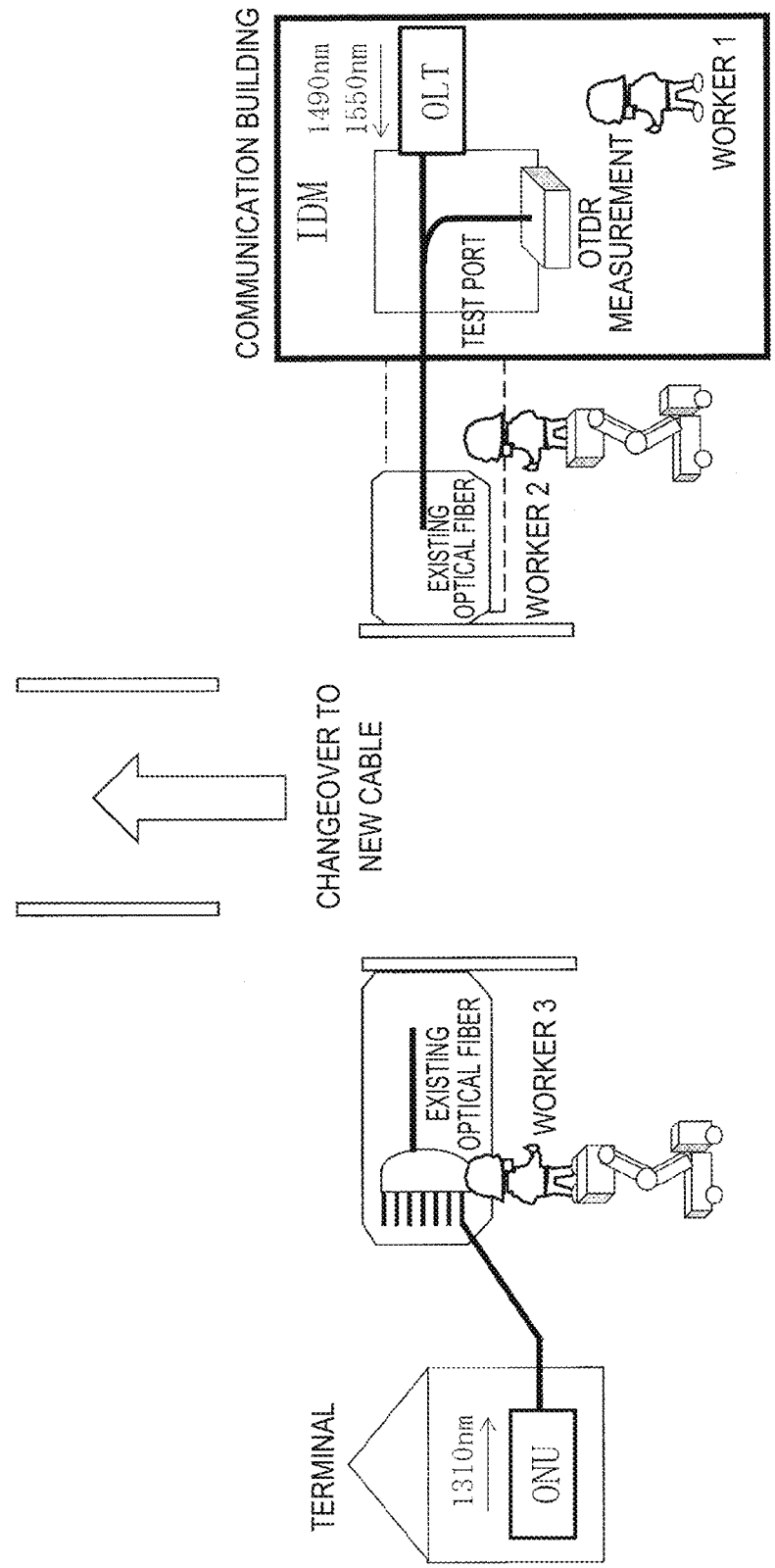
FIG. 3 is a diagram illustrating the optical fiber changeover construction.
Figure 4:
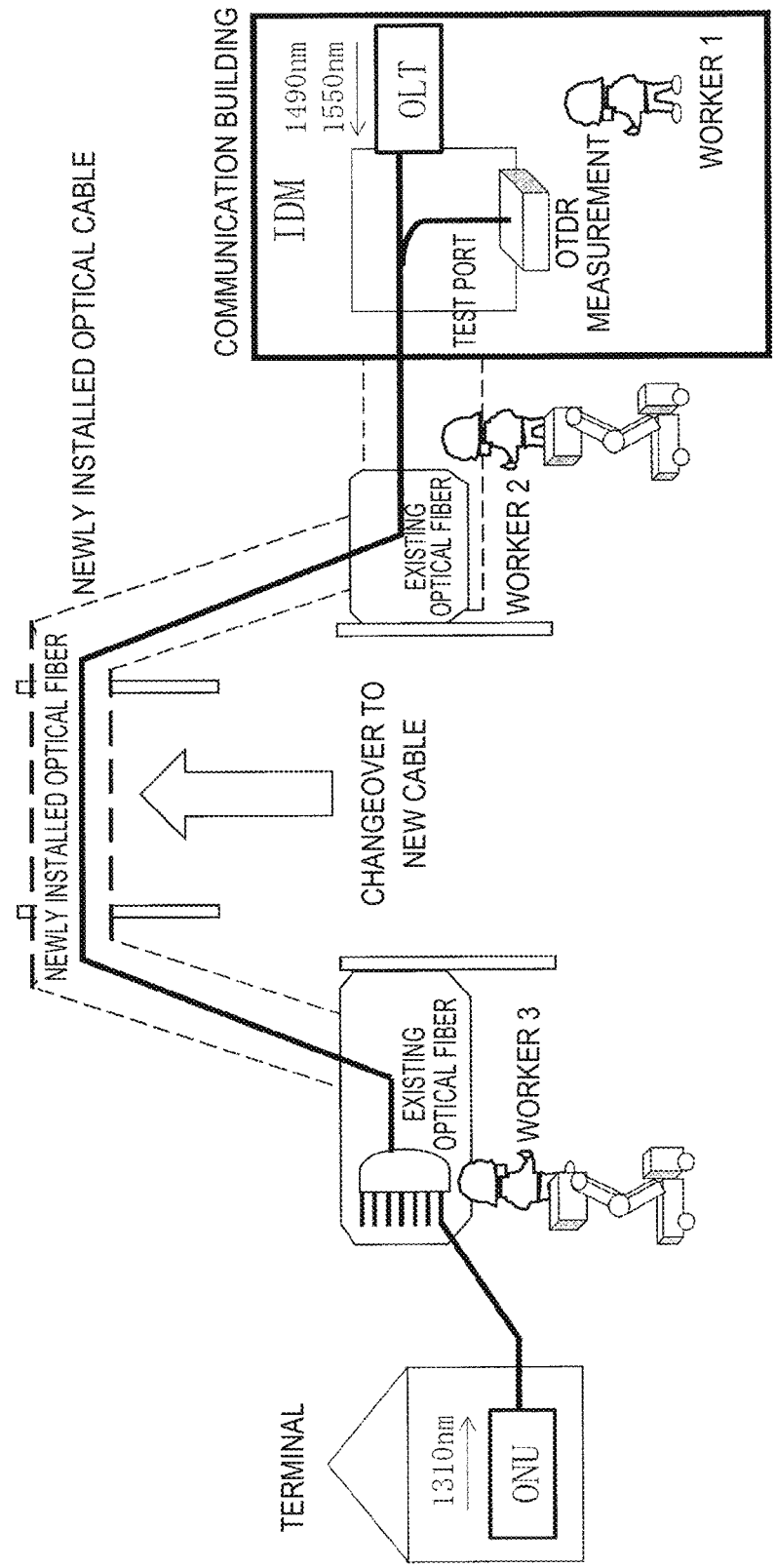
FIG. 4 is a diagram illustrating the optical fiber changeover construction.
Figure 5:
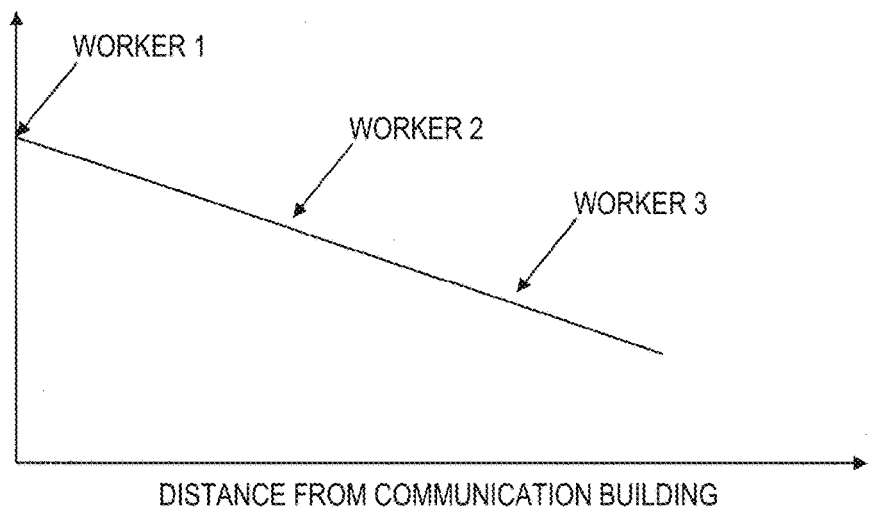
FIG. 5 is a diagram illustrating a waveform of OTDR measurement acquired during the optical fiber changeover construction.
Figure 6:
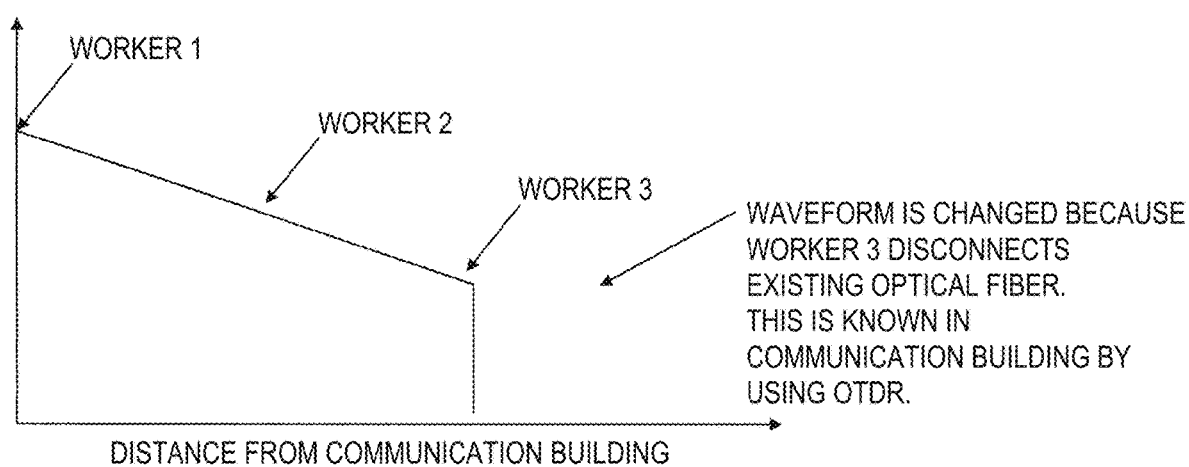
FIG. 6 is a diagram illustrating the waveform of the OTDR measurement acquired during the optical fiber changeover construction.
Figure 7:
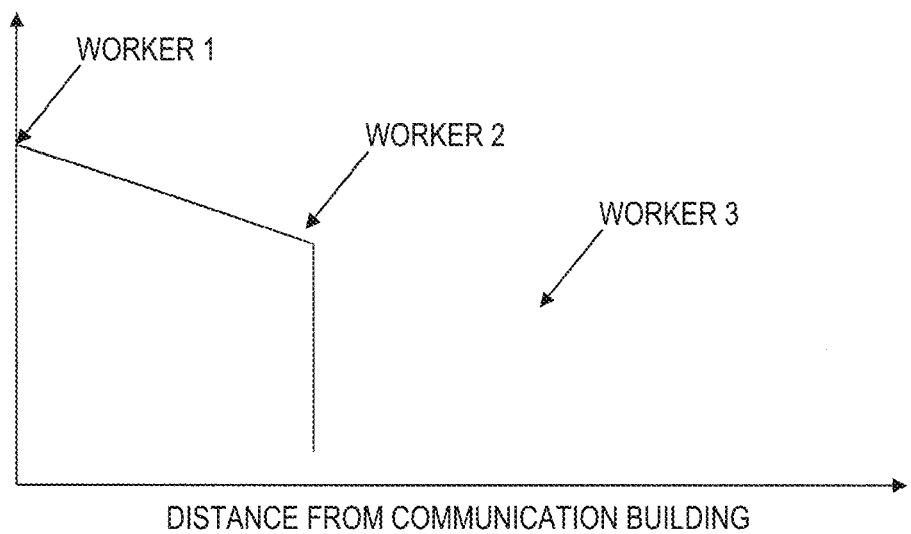
FIG. 7 is a diagram illustrating the waveform of the OTDR measurement acquired during the optical fiber changeover construction.
Figure 8:
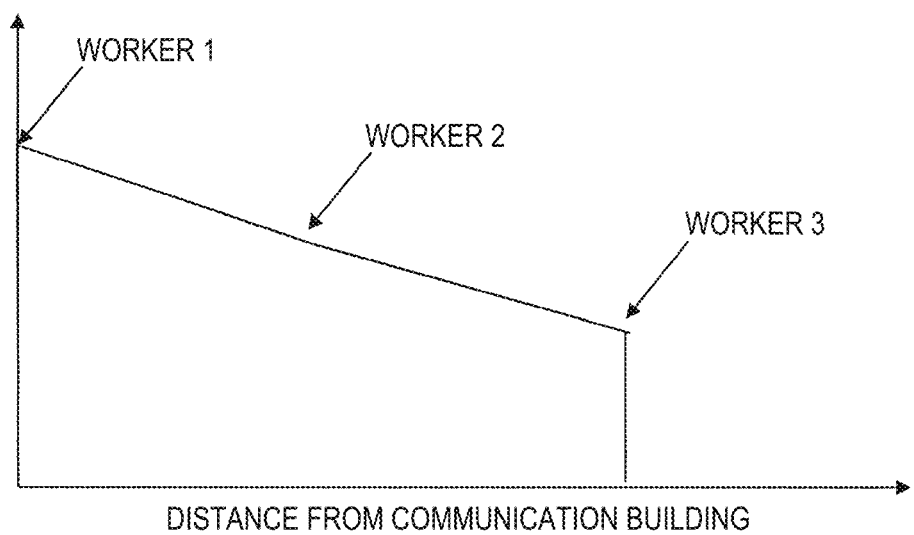
FIG. 8 is a diagram illustrating the waveform of the OTDR measurement acquired during the optical fiber changeover construction.
Figure 9:
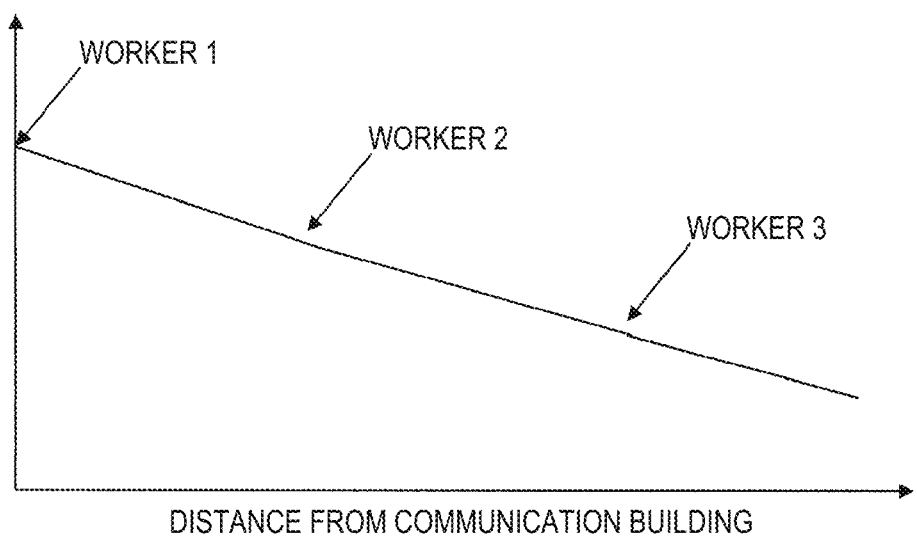
FIG. 9 is a diagram illustrating the waveform of the OTDR measurement acquired during the optical fiber changeover construction.

In the related art, as described with reference to FIG. 2 to FIG. 4, the OTDR test device is disposed in the communication building, and the workers confirm disconnection of the optical fiber and connection of the newly installed optical fiber by using the communication light having the wavelength of 1650 nm. The present invention provides a method in which no worker is arranged in the communication building in order to improve work efficiency. More specifically, communication light output from the OLT and communication light output from the ONU are used.

Figure 10:
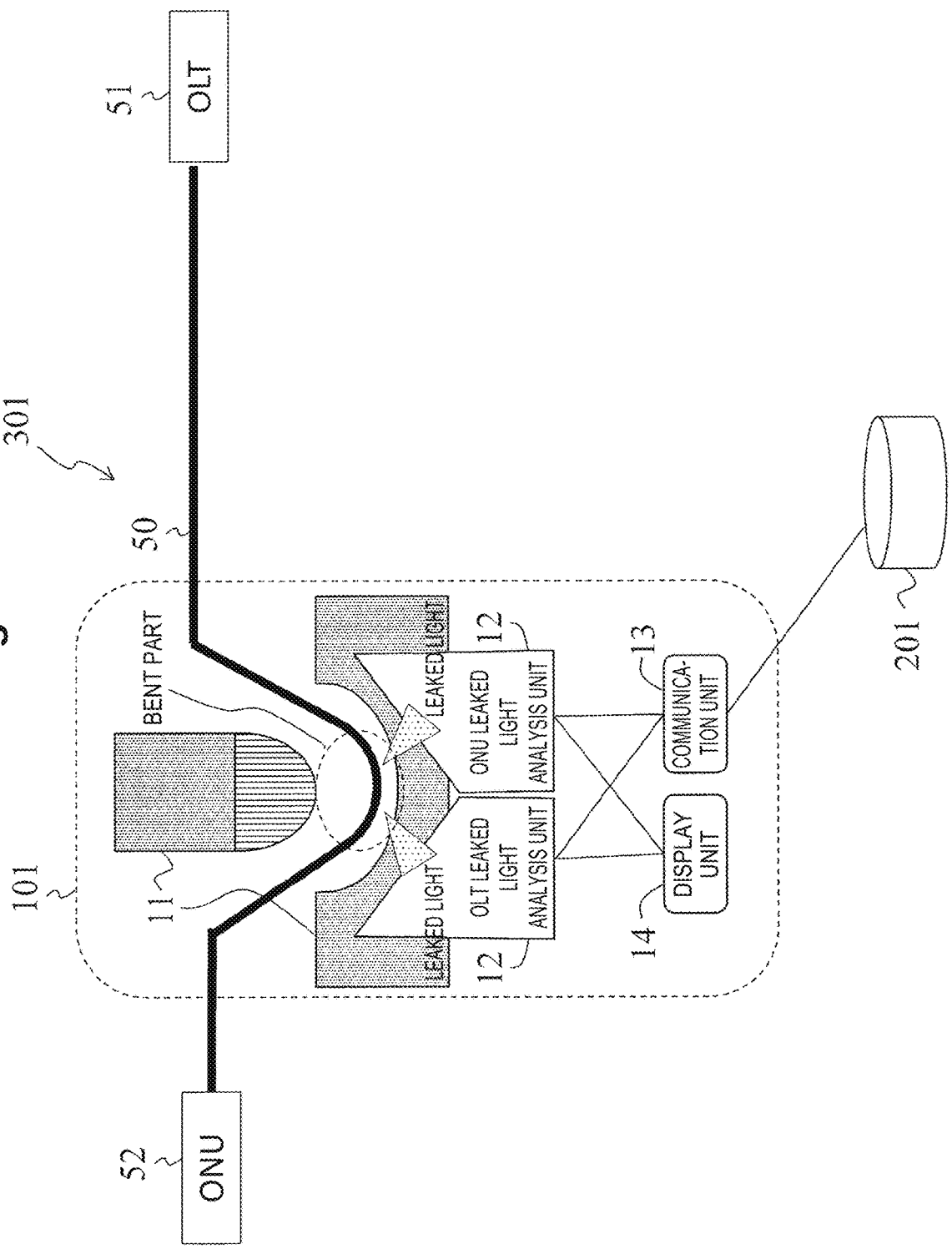
FIG. 10 is a diagram illustrating an optical fiber display system according to the present invention.

FIG. 10 is a diagram illustrating an optical fiber display system 301 according to the present embodiment. The optical fiber display system 301 is an optical fiber display system including a plurality of core wire identification terminals 101. Each of the core wire identification terminals 101 includes bent part formation units 11, analysis units 12, a communication unit 13, and a display unit 14. The bent part formation units 11 form a bent part at an optional position of an optical fiber 50, to leak optical signals propagating through the optical fiber 50 from the bent part. The analysis units 12 acquire identification numbers of communication apparatuses (51 and 52) included in the leaked optical signals. The communication apparatuses (51 and 52) are connected to respective ends of the optical fiber 50. The communication unit 13 inquires of a database 201 that stores relationship between the optical fiber and the communication apparatuses, about the acquired identification numbers of the communication apparatuses, and receives, from the database 201, an identification number of the optical fiber 50 corresponding to the acquired identification numbers of the communication apparatuses. The display unit 14 displays the acquired identification numbers of the communication apparatuses and the received identification number of the optical fiber 50. Although the optical fiber display system 301 includes two core wire identification terminals 101 as described with reference to FIG. 14 and subsequent drawings, only one core wire identification terminal 101 is illustrated for description in FIG. 10 to FIG. 13.

Communication light output from each of an OLT 51 and an ONU 52 includes a MAC address (Media Access Control address: hereinafter, abbreviated as MAC address) as a specific identification number assigned to each of the OLT 51 and the ONU 52. The MAC addresses are acquired on the construction site where disconnection and connection of the optical fiber are performed, which enables efficient construction. In the present embodiment, a MAC address acquisition method is described.

As a method of easily taking out the communication light outdoors, there is a method of bending the optical fiber. The communication light confined in a core of the optical fiber leaks to outside of the core when the optical fiber is bent. Bending of the optical fiber is suitable for the construction site because the optical fiber is thin and pliant.

The OLT 51 and the ONU 52 are connected to the respective ends of the optical fiber 50, and communicate with each other. The core wire identification terminal 101 is disposed at a desired position of the optical fiber 50. The optical fiber 50 is sandwiched by the bent part formation unit 11 having a concave shape and the bent part formation unit 11 having a convex shape, to bend the optical fiber 50. The communication light of each of the OLT 51 and the ONU 52 separately leaks from the bent part of the optical fiber 50.

The analysis units 12 acquire and analyze the leaked light. An avalanche photodiode (abbreviated as APD) that is a kind of photodiodes is used for each of the analysis units 12. This is because the signals cannot be analyzed by a low-speed photodiode because the communication light has high speed. Each of the analysis units 12 converts the optical signal into an electric signal by the APD, takes out only information on the MAC address from the electric signal, and the MAC address is displayed on the display unit 14.

Embodiment 2

Figure 11:
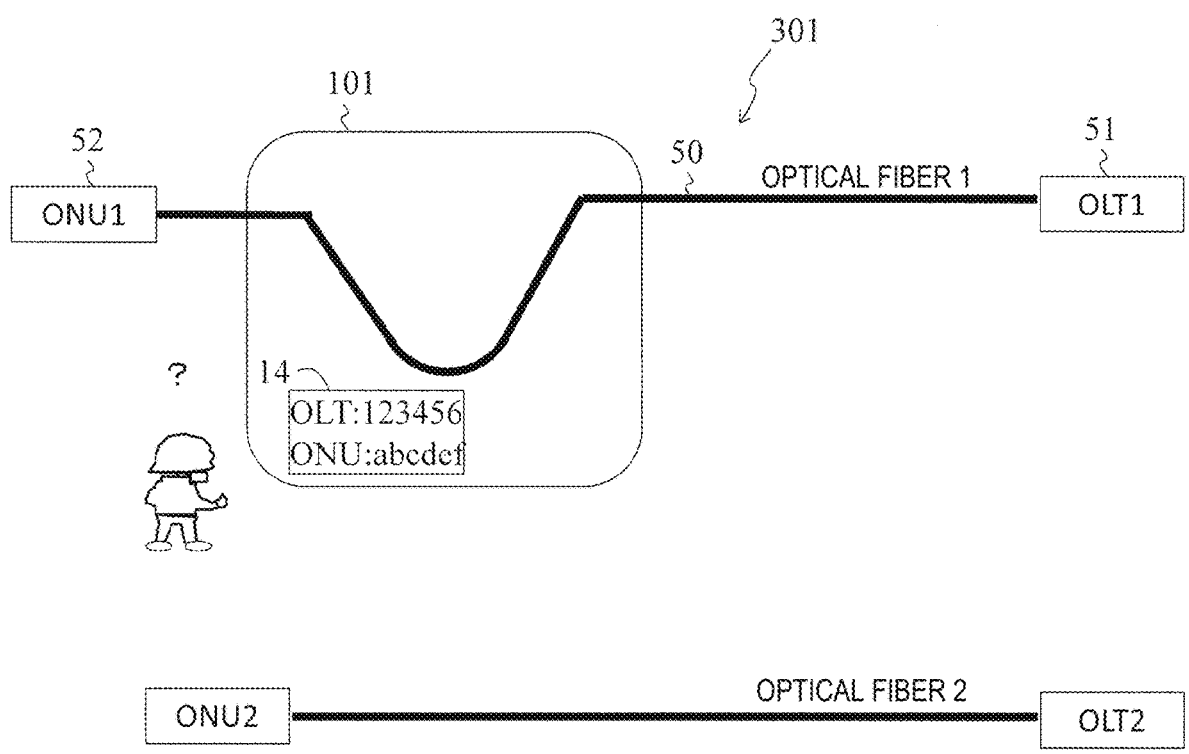
FIG. 11 is a diagram illustrating the optical fiber display system according to the present invention.
Figure 12:
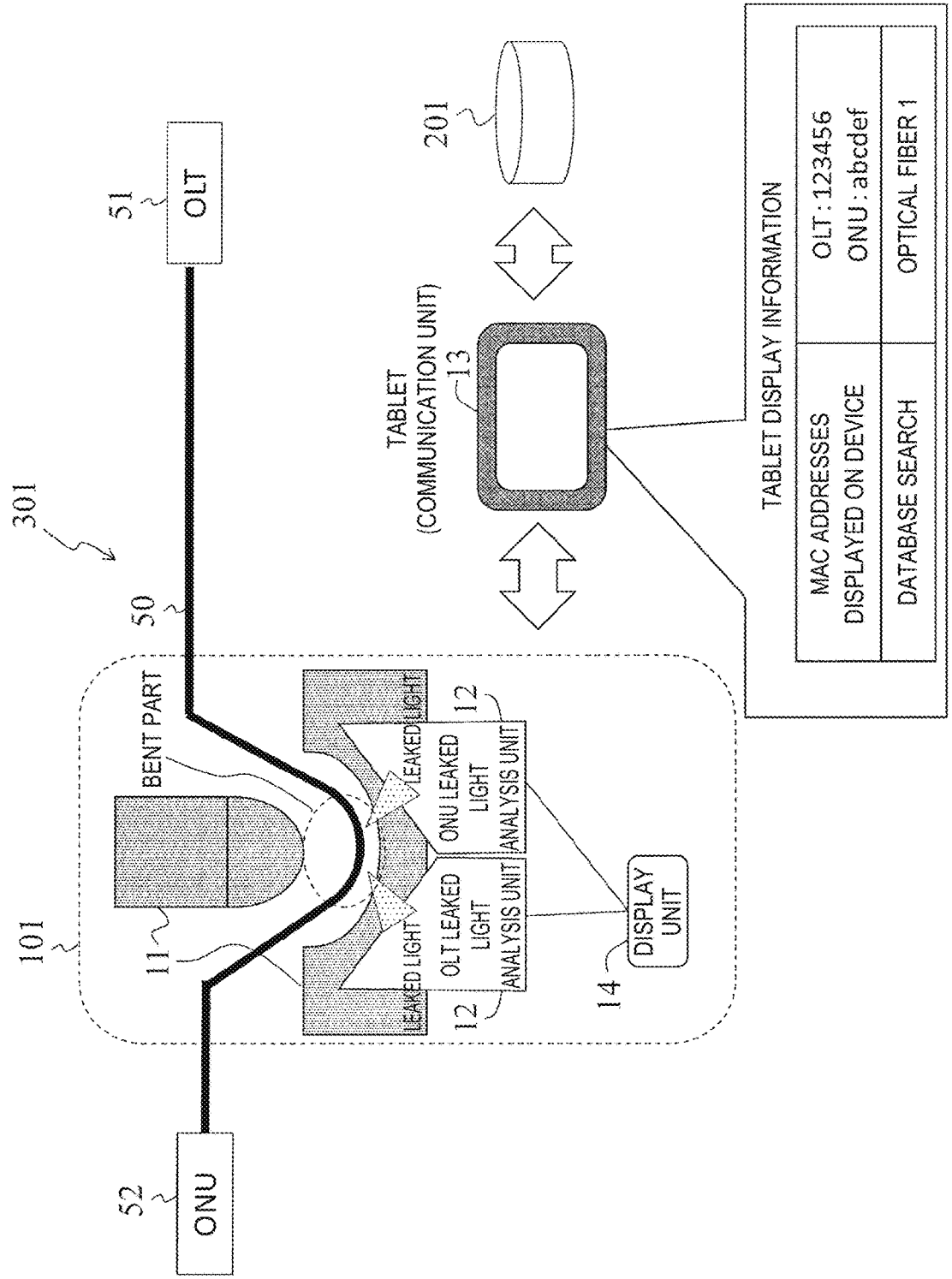
FIG. 12 is a diagram illustrating the optical fiber display system according to the present invention.
Figure 13:
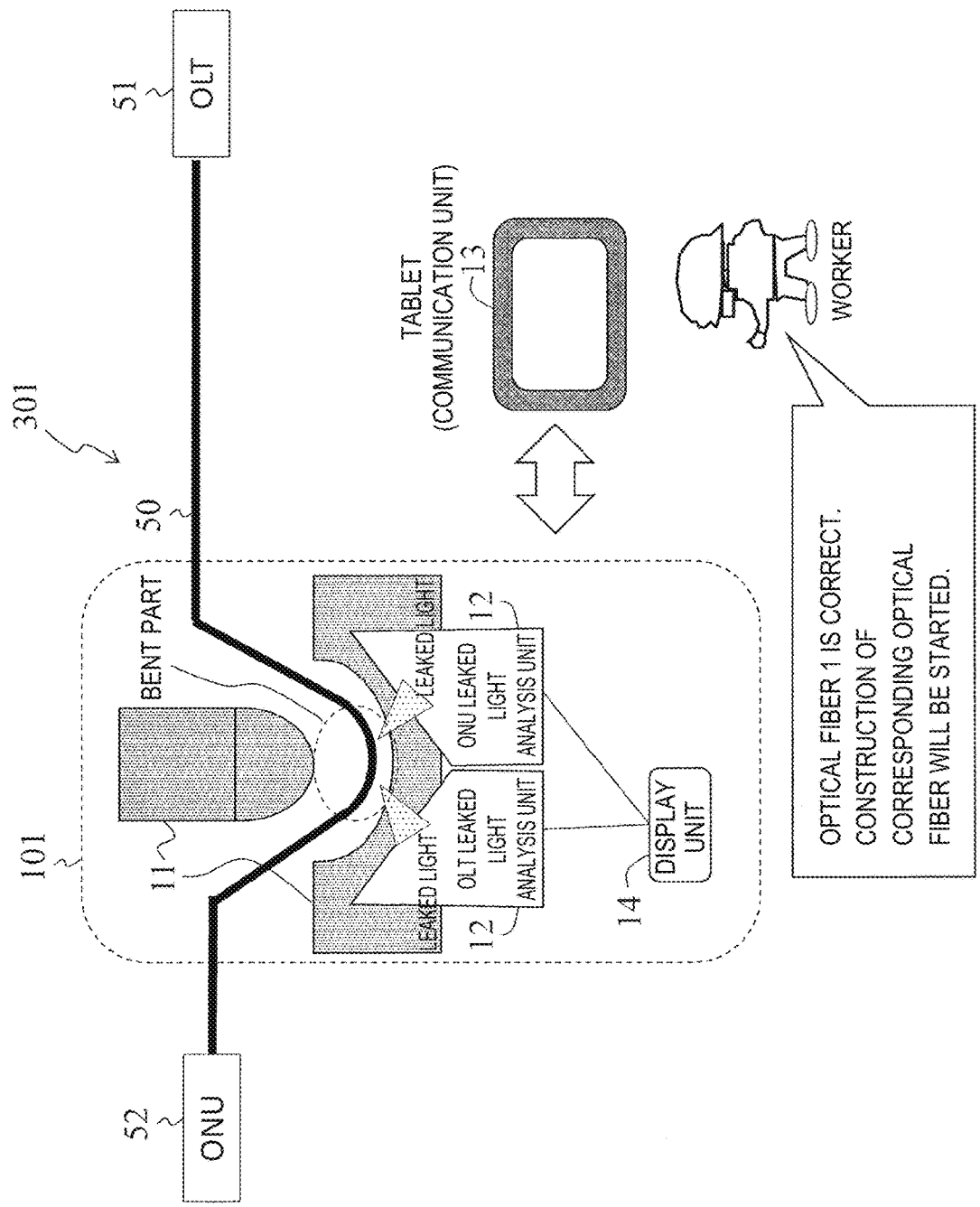
FIG. 13 is a diagram illustrating the optical fiber display system according to the present invention.

FIG. 11 to FIG. 13 are diagrams illustrating the present embodiment. As described in Embodiment 1, the MAC addresses of the OLT 51 and the ONU 52 are acquired by bending the optical fiber 50. However, the MAC addresses displayed on the display unit 14 are rows of numbers. Therefore, the worker cannot determine whether the corresponding optical fiber is an optical fiber to be changed over, only by looking at the MAC addresses.

Therefore, in the present embodiment, the communication unit 13 that communicates with the database 201 managing the optical access network is used. The communication unit 13 is, for example, a tablet terminal portable by the worker. For example, the core wire identification terminal 101, the communication unit 13, and the database 201 are wirelessly communicable with one another.

The core wire identification terminal 101 acquires the MAC addresses of the OLT 51 and the ONU 52. For example, it is assumed that the MAC address of the OLT 51 is 123456 and the MAC address of the ONU 52 is abcdef. The tablet (communication unit 13) inquires of the database 201 about the information on the MAC addresses. The database 201 manages the MAC addresses of the OLT and the ONU connected to the optical fiber, the number of connection points, a length of the optical fiber, and the like. When the information on the MAC addresses is inquired to the database 201, a number of the optical fiber corresponding to the MAC addresses is transmitted from the database 201 to the tablet. The tablet displays the number of the optical fiber on a screen. For example, it is assumed that the displayed number of the optical fiber is 1.

The worker can recognize the number of the currently selected optical fiber as illustrated in FIG. 13. The worker confirms that the displayed number and a number of an optical fiber instructed in construction directions or the like are coincident with each other, and then starts the construction. Therefore, the optical fiber to be constructed can be confirmed only by the worker on the site without arranging the worker in the communication building.

Embodiment 3

Figure 14:
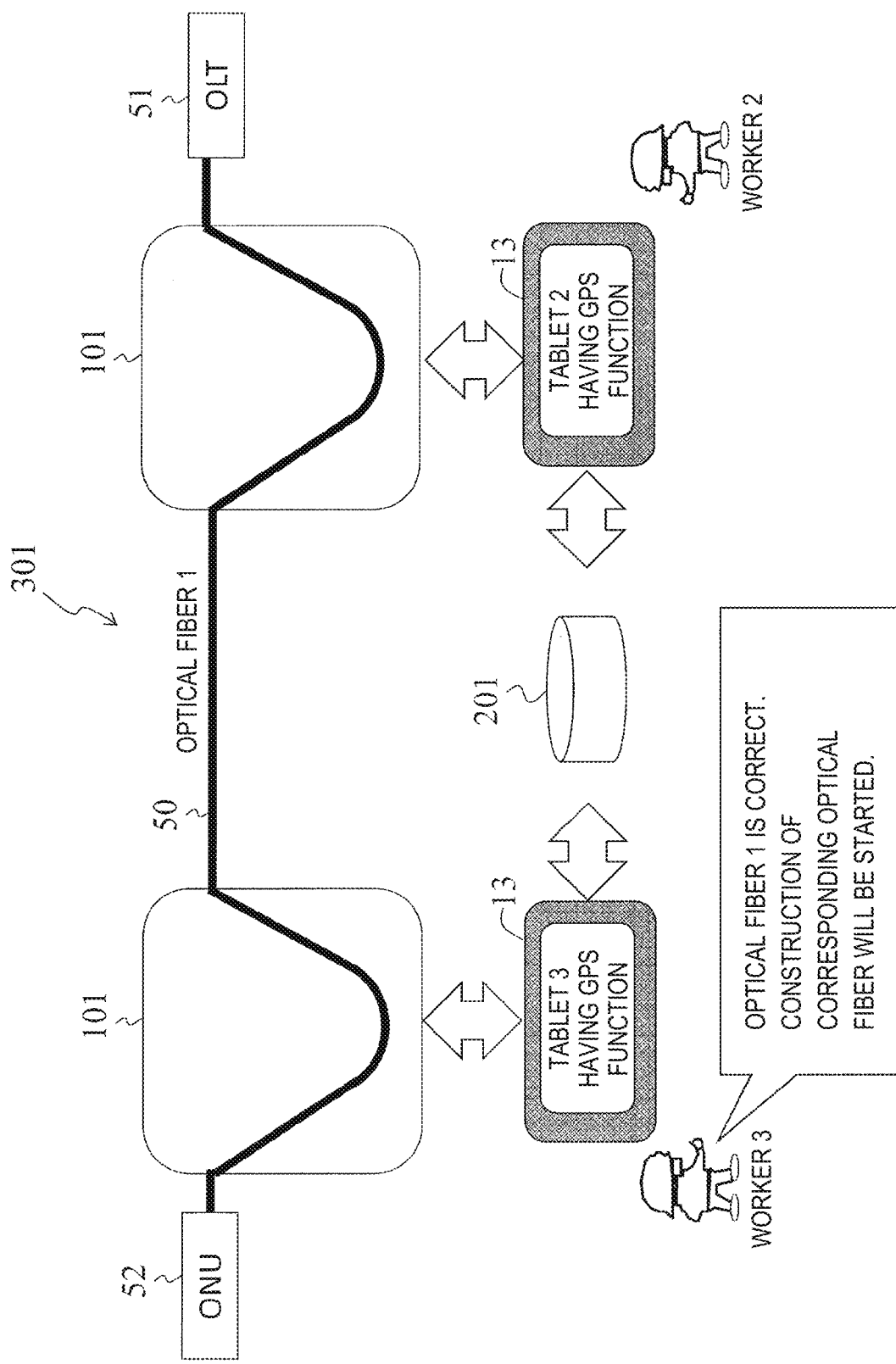
FIG. 14 is a diagram illustrating an optical fiber changeover method according to the present invention.

FIG. 14 is a diagram illustrating the present embodiment. FIG. 2 to FIG. 4 illustrate that the changeover construction of the optical fiber 50 is performed at two positions other than the communication building. The worker 2 and the worker 3 are arranged at the two positions and each perform disconnection and connection of the optical fiber 50. Both works are required to perform the work on the correct optical fiber 50. In other words, it is unacceptable that the worker 3 disconnects the optical fiber different from the optical fiber disconnected by the worker 2. Therefore, a mechanism to share the information on both worker sides is necessary. Therefore, the following two functions are provided as new functions to the tablets.
(1) GPS function
(2) Function to recognize paired tablets and to display same information on the paired tablets In other words, each of the core wire identification terminals further includes a positional information acquisition unit grasping a position of the own terminal, and has two features described below. As a first feature, the communication units of the core wire identification terminals mutually notify the identification numbers of the communication apparatuses, the identification number of the optical fiber, and the grasped position of the own terminal. As the second feature, the display units of the core wire identification terminals each displays the identification numbers of the communication apparatuses, the identification number of optical fiber, and the position of the other core wire identification terminal notified from the other core wire identification terminal.

In FIG. 14, each of the two workers (worker 2 and worker 3) uses the core wire identification terminal 101, acquires the MAC address information on the OLT 51 and the ONU 52, and accesses the database 201 by using the tablet (communication unit 13). The tablets each have the GPS function, which enables the workers to know the own positions. Further, communication between the tablets enables the worker 2 and the worker 3 to share information illustrated in FIG. 15.

A changeover point of the optical fiber may be different for each optical fiber. In this case, when the construction of one optical fiber is completed, it is necessary for the worker to move for the construction of the other optical fiber. When the tablets each have the GPS function, the workers are visualized, and movement of the workers can be displayed on a screen in real time.

Embodiment 4

Figure 15:
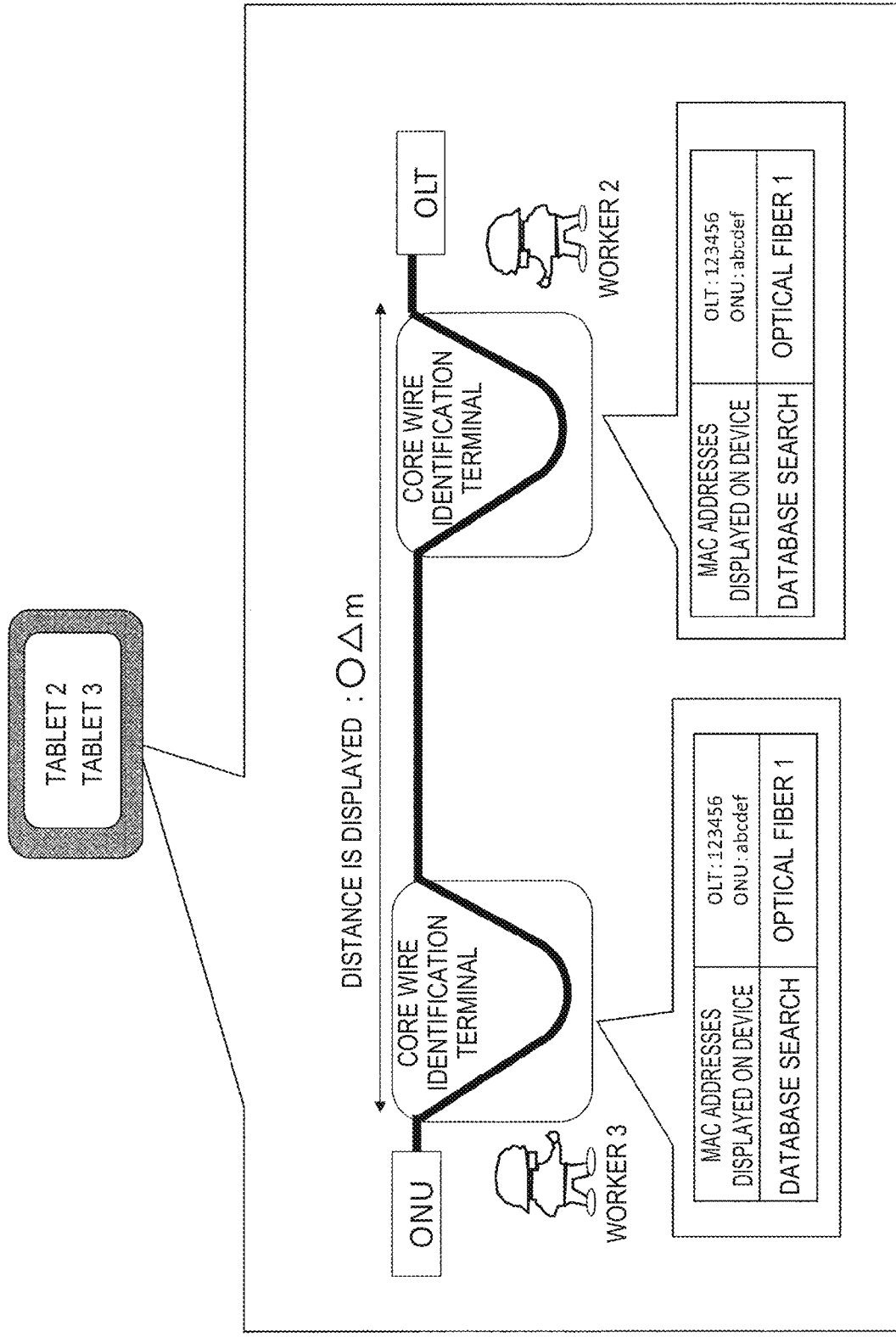
FIG. 15 is a diagram illustrating the optical fiber changeover method according to the present invention.

Illustration in FIG. 15 is further described. The two workers each bend the optical fiber 50, acquire the MAC addresses of the ONU 52 and the OLT 51, and acquire the number of the optical fiber from the database. Each of the tablets displays the information for the two works on the screen. Further, the tablets grasp the mutual positions by using the GPS function, and each display a distance between the worker 2 and the worker 3 on the screen.

Embodiment 5

FIG. 16 to FIG. 22 are diagrams illustrating the optical fiber changeover method according to the present embodiment. This optical fiber changeover method is an optical fiber changeover method of changing over a partial section of the optical fiber from an existing optical fiber to a newly installed optical fiber in an optical access network connecting an OLT and ONU by the optical fiber, and performs five steps described below. A first step is a specification step of specifying the existing optical fiber to be changed over. A second step is a disconnection step of disconnecting the existing optical fiber. A third step is an information update step of updating information in a database. A fourth step is a connection step of connecting the newly installed optical fiber. A fifth step is a confirmation step performed after the newly installed optical fiber is connected.

In the specification step, identification numbers of the OLT and the ONU as communication apparatuses are acquired by using core wire identification terminals at both ends of the partial section. Further, the acquired identification numbers of the communication apparatuses are inquired to the database storing relationship of the optical fiber, the OLT, and the ONU to acquire an identification number of the optical fiber corresponding to the identification numbers of the communication apparatuses. Further, it is confirmed in the core wire identification terminals that the acquired identification number of the optical fiber is coincident with the identification number of the existing optical fiber to be changed over.

In the disconnection step, an end on the ONU side out of both ends of the partial section is first disconnected, and an end on the OLT side is disconnected after the identification number of the ONU as the communication apparatus is hidden on the core wire identification terminal on the OLT side.

In the information update step, the identification number of the optical fiber in the database is rewritten from the identification number of the existing optical fiber to the identification number of the newly installed optical fiber.

In the connection step, the end on the OLT side out of both ends of the partial section is first connected, and the end on the ONU side is connected after the identification number of the OLT as the communication apparatus is displayed on the core wire identification terminal on the OLT side.

In the confirmation step, the identification number of the OLT and the ONU as the communication apparatuses are acquired by using the core wire identification terminals at both ends of the partial section. Further, the acquired identification numbers of the communication apparatuses are inquired to the database to acquire the identification number of the optical fiber corresponding to the identification numbers of the communication apparatuses. The acquired identification numbers of the communication apparatuses and the identification number of the optical fiber corresponding to the acquired identification numbers of the communication apparatuses are confirmed by the core wire identification terminals.

When the two workers each have the tablet having the functions described in Embodiments 3 and 4, the optical fiber can be changed over only by the workers on the construction site. This is described below.

Figure 16:
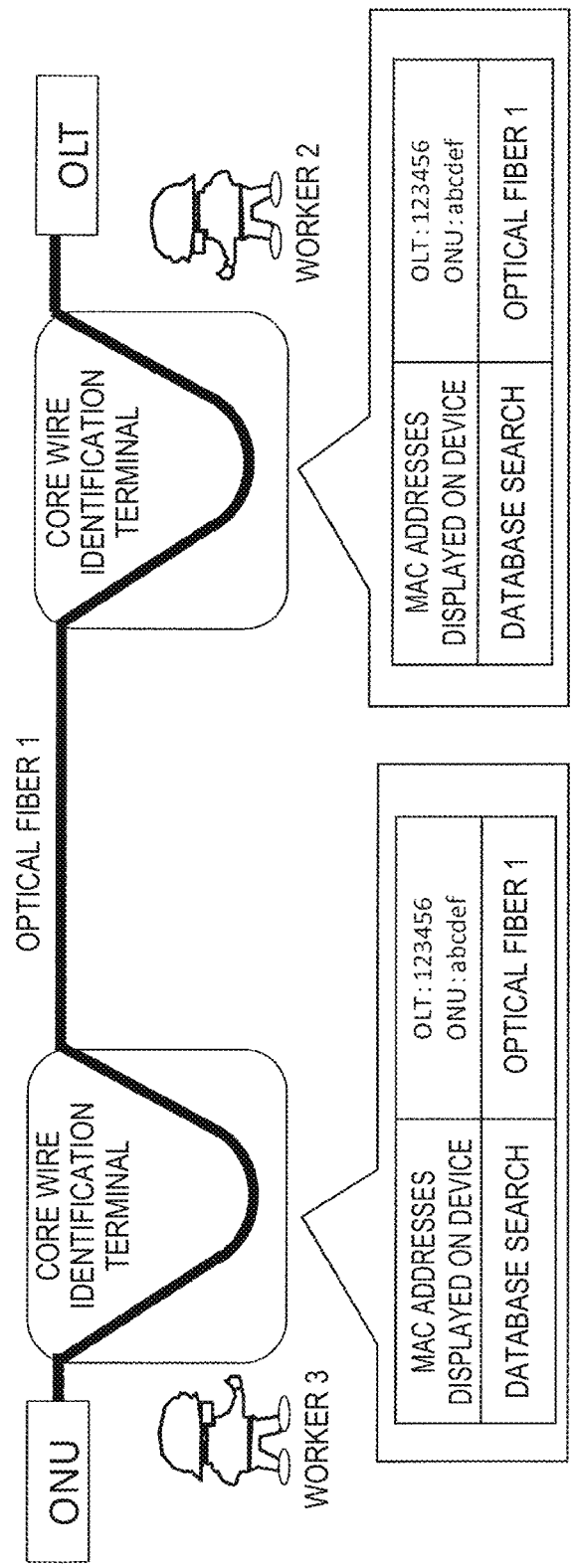
FIG. 16 is a diagram illustrating the optical fiber changeover method according to the present invention.

FIG. 16 is a diagram illustrating the specification step. In this step, the MAC addresses of the OLT and the ONU are displayed on the tablets held by the two workers, and the number of the optical fiber with which the MAC addresses are registered is inquired to the database. Further, the number of the optical fiber as a result of the inquiry is displayed on the tablets. In FIG. 16, a number "1" that is the number of the optical fiber to be constructed is displayed. Therefore, the optical fiber has been specified.

Figure 17:
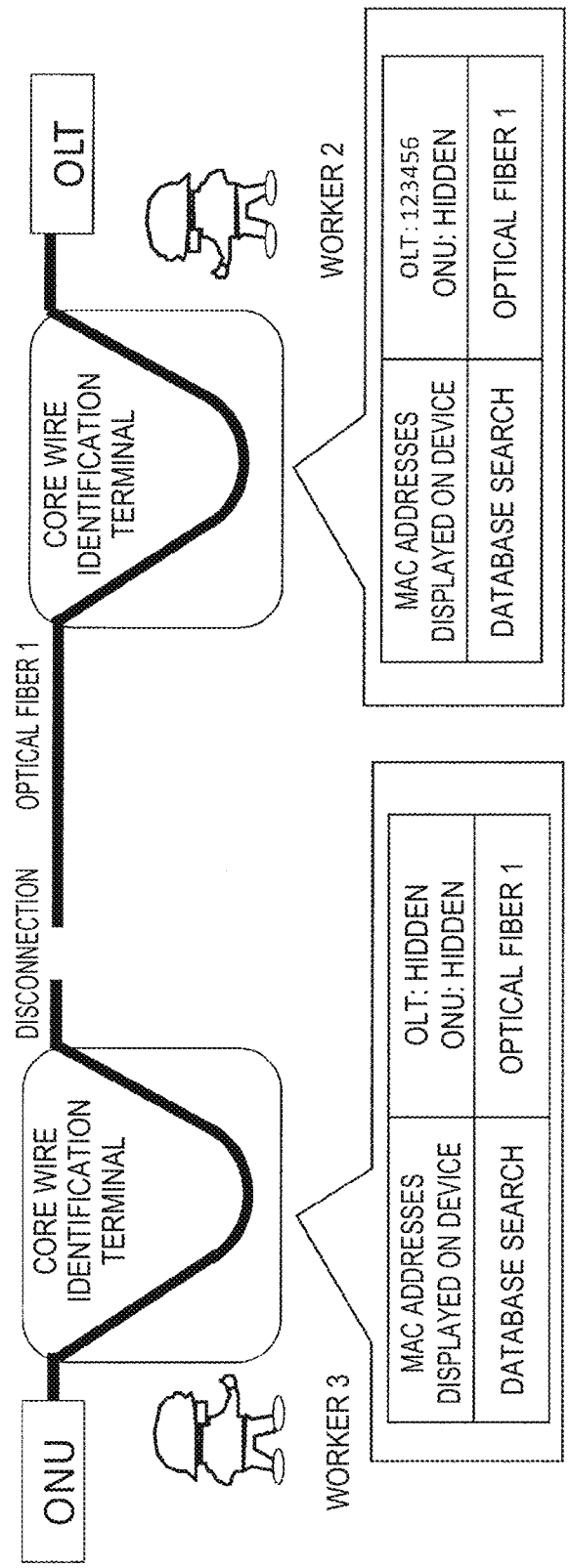
FIG. 17 is a diagram illustrating the optical fiber changeover method according to the present invention.

FIG. 17 is a diagram illustrating a step of disconnecting the optical fiber on the ONU side (worker 3 side) in the disconnection step. The OLT and the ONU communicate with each other while recognizing each other. At this time, when the optical fiber is disconnected, the OLT unilaterally outputs the optical signal, whereas the ONU stops communication because the signal from the OLT does not arrive. Therefore, when the worker 3 disconnects the optical fiber, the optical signal output from the ONU is stopped but the optical signal output from the OLT is maintained.

When viewed from the worker 3, the optical fiber is disconnected on the OLT side. Therefore, the optical signal from the OLT does not arrive, and the MAC address of the OLT is hidden in a display field on the worker 3 side. In addition, the optical signal from the OLT does not arrive the ONU. Therefore, the ONU does not output the optical signal, and the MAC address of the ONU is hidden in the display field on the worker 3 side.

In contrast, when viewed from the worker 2, the optical fiber is disconnected on the ONU side. Therefore, only the signal of the OLT arrives. Accordingly, only the MAC address of the OLT is displayed in a display field on the worker 2 side. The MAC address of the ONU is hidden in the display field on the worker 2 side.

Accordingly, disconnection of the optical fiber by the worker 3 can be grasped from the state displayed in the display field of each of the tablets. Further, the state is displayed on the tablets of both workers, which enables both workers to share the information.

Figure 18:
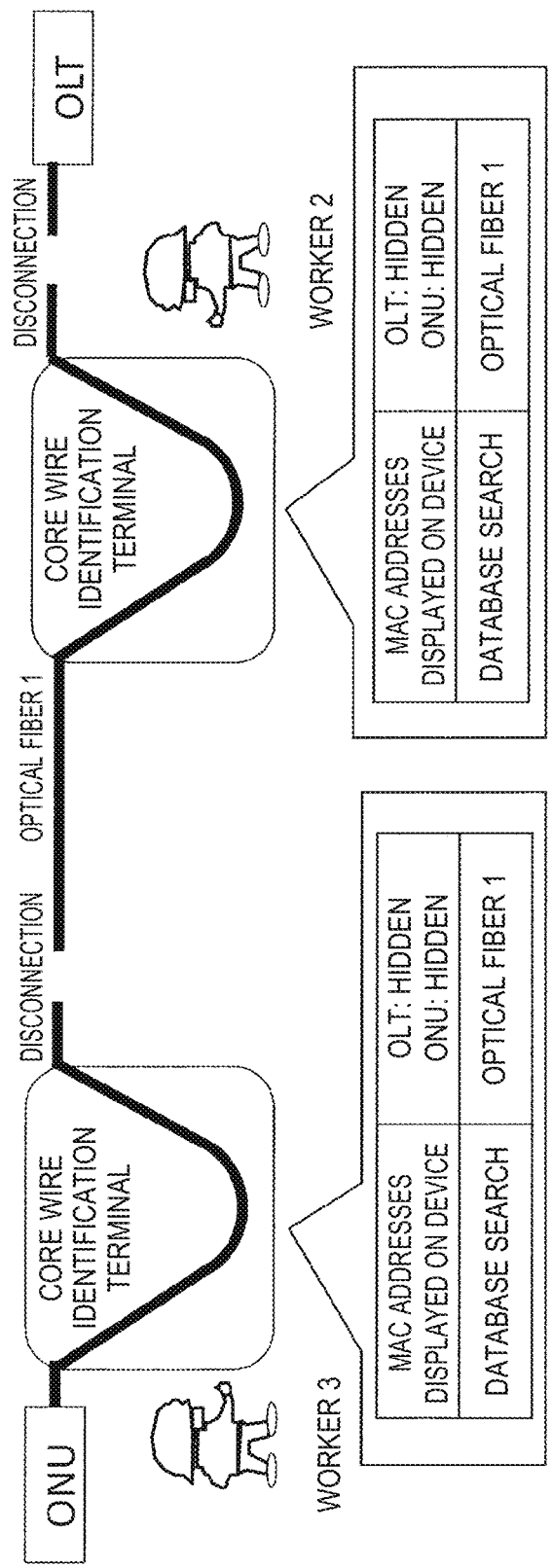
FIG. 18 is a diagram illustrating the optical fiber changeover method according to the present invention.

FIG. 18 is a diagram illustrating a step of disconnecting the optical fiber on the OLT side (worker 2 side) in the disconnection step. On the OLT side, the optical fiber is disconnected at a position between the core wire identification terminal and the OLT. When the optical fiber is disconnected at this position, the optical signal from the OLT does not arrive at the core wire identification terminal of the worker 2, and the MAC address of the OLT is hidden in the display field on the worker 2 side. In other words, the MAC address is not displayed in any of the display fields.

Accordingly, disconnection of the optical fiber by the worker 2 can be grasped from the state displayed in the display field of each of the tablets. Further, the state is displayed on the tablets of both workers, which enables both workers to share the information.

Figure 19:
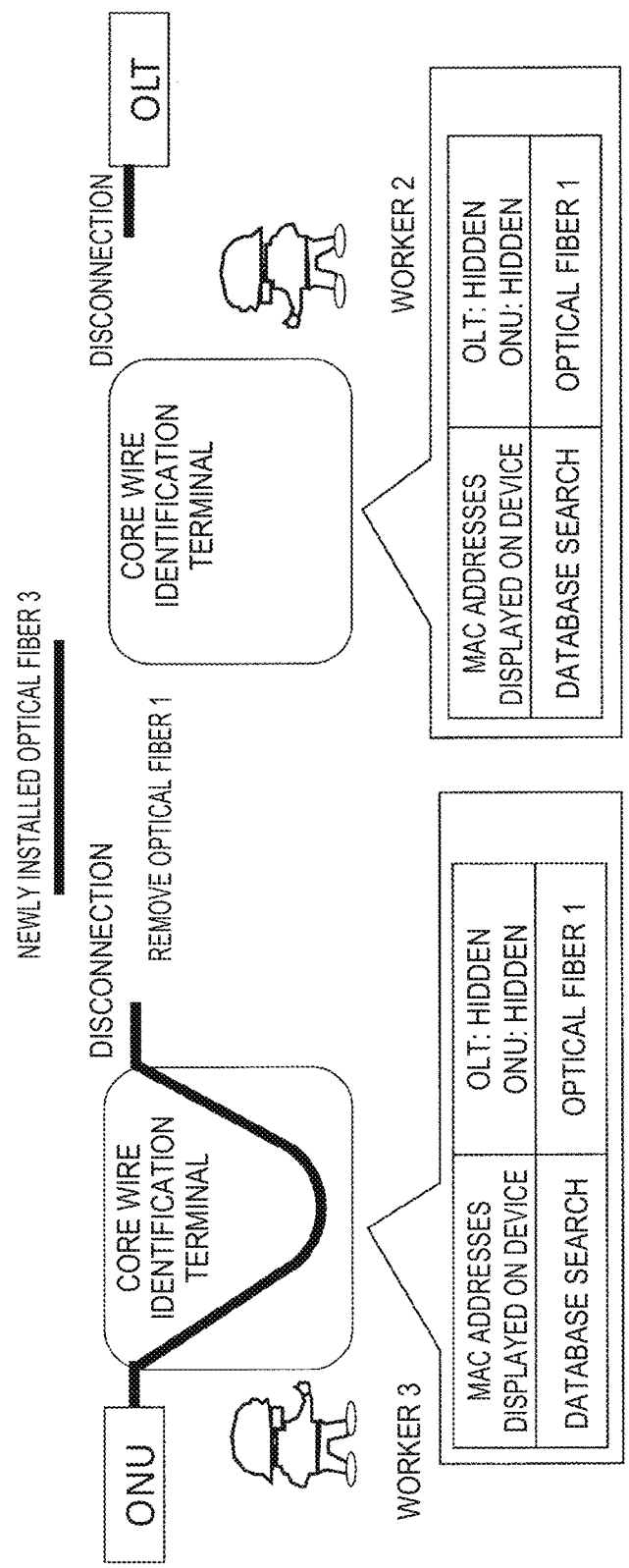
FIG. 19 is a diagram illustrating the optical fiber changeover method according to the present invention.

FIG. 19 is a diagram illustrating removal of the disconnected optical fiber and preparation of the newly installed optical fiber. In this state, the display on the tablets is not changed.

Figure 20:
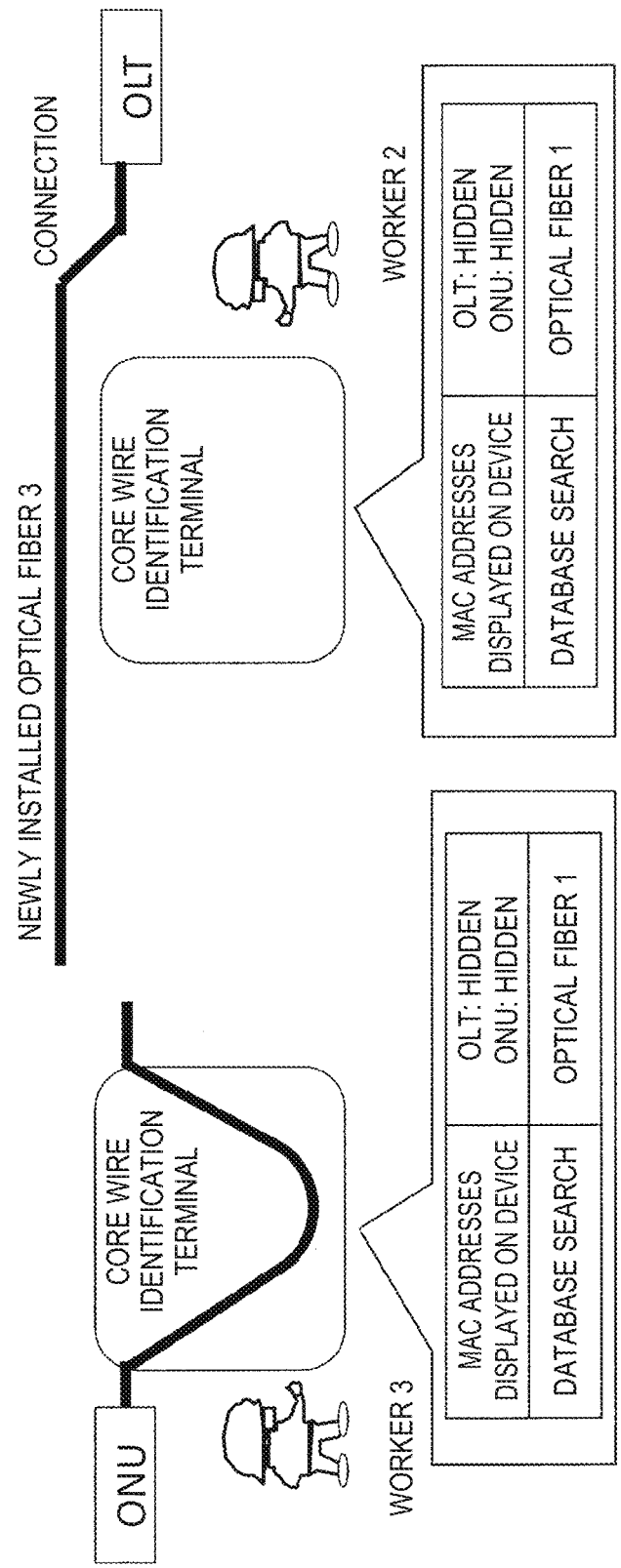
FIG. 20 is a diagram illustrating the optical fiber changeover method according to the present invention.
Figure 21:
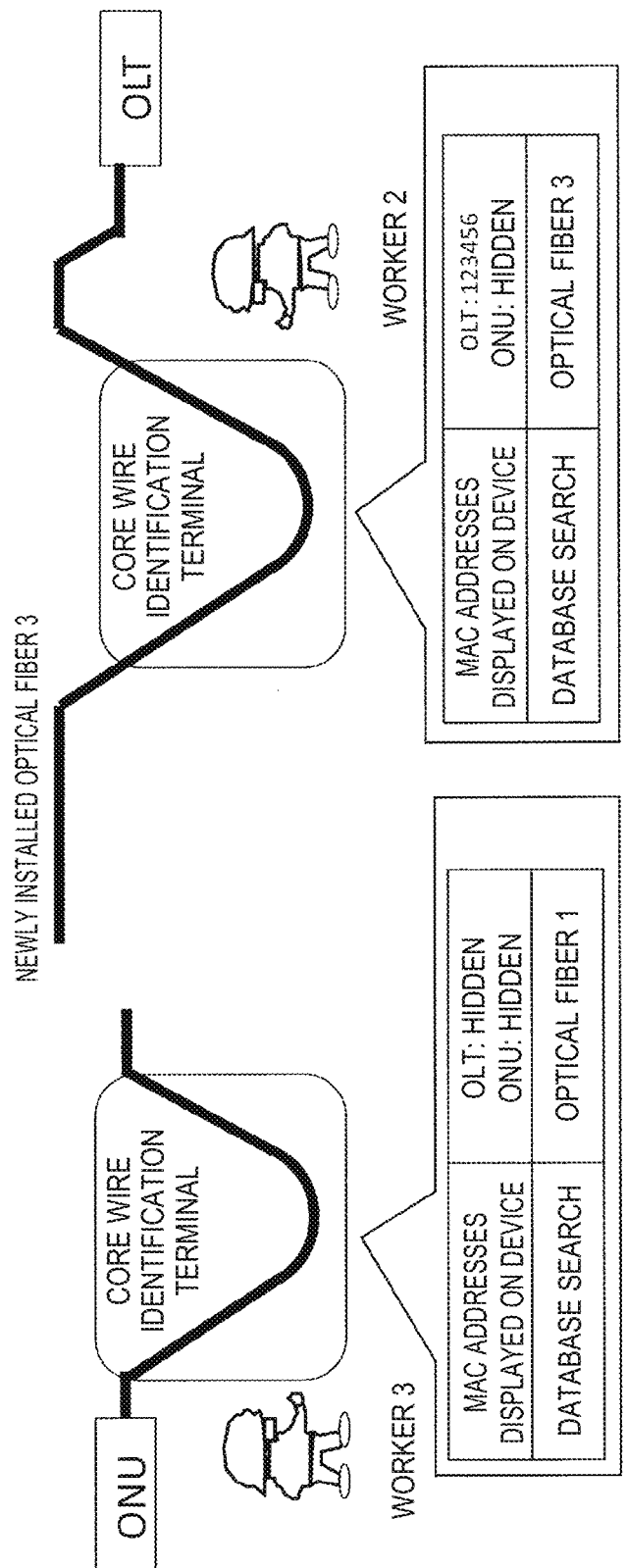
FIG. 21 is a diagram illustrating the optical fiber changeover method according to the present invention.

FIG. 20 is a diagram illustrating a step of connecting the newly installed optical fiber to the OLT side (worker 2 side) in the connection step. When the newly installed optical fiber 3 is connected to the OLT side, the optical signal form the OLT arrives at the core wire identification terminal of the worker 2, and the MAC address of the OLT is displayed in the display field on the worker 2 side. Accordingly, connection of the newly installed optical fiber by the worker 2 can be grasped from the state displayed in the display field on each of the tablets. Further, the state is displayed on the tablets of both workers, which enables both workers to share the information.

Note that, the information update step is preferably performed before or during the connection step. In the information update step, the worker 2 or 3 writes change of the optical fiber from the existing optical fiber 1 to the newly installed optical fiber 3 in the tablet. The tablet then accesses the database and updates information in the database. As a result, the number of the optical fiber displayed in the display field of each of the tablets in the connection step is changed from "1 (existing)" to "3 (newly installed)".

Figure 22:
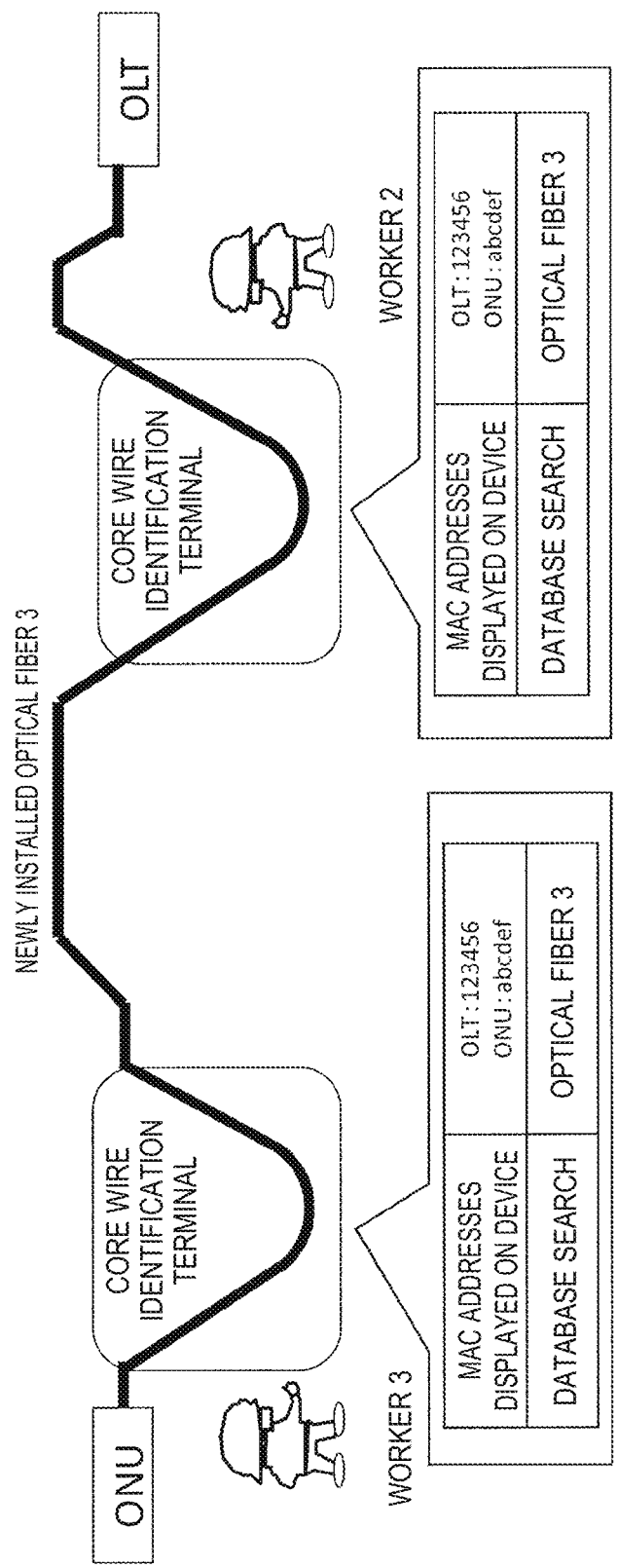
FIG. 22 is a diagram illustrating the optical fiber changeover method according to the present invention.

FIG. 22 is a diagram illustrating a step of connecting the newly installed optical fiber to the ONU side (worker 3 side) in the connection step. When the worker 3 connects the newly installed optical fiber 3 to the ONU side, communication between the OLT and the ONU is recovered. The optical signal from the OLT also arrives at the core wire identification terminal of the worker 3, and the MAC address of the OLT is displayed also in the display field on the worker 3 side. Further, the ONU starts to output the optical signal. Therefore, the optical signal from the ONU arrives at the core wire identification terminals of both workers, and the MAC address of the ONU is displayed in the display fields on both worker sides.

Accordingly, connection of the newly installed optical fiber by the worker 3 can be grasped from the state displayed in the display field of each of the tablets. Further, the state is displayed on the tablets of both workers, which enables both workers to share the information. The state indicates completion of the changeover construction.

In the related art, the worker issues an instruction to the workers on the construction site from the communication building by using the OTDR test device. However, using the optical fiber display system 301 allows for the confirmation work on the construction site and the changeover construction of the optical fiber. The work can be collected to the construction site while the number of workers is reduced. This is obviously efficient as compared with the existing construction method.

Embodiment 6

Figure 23:
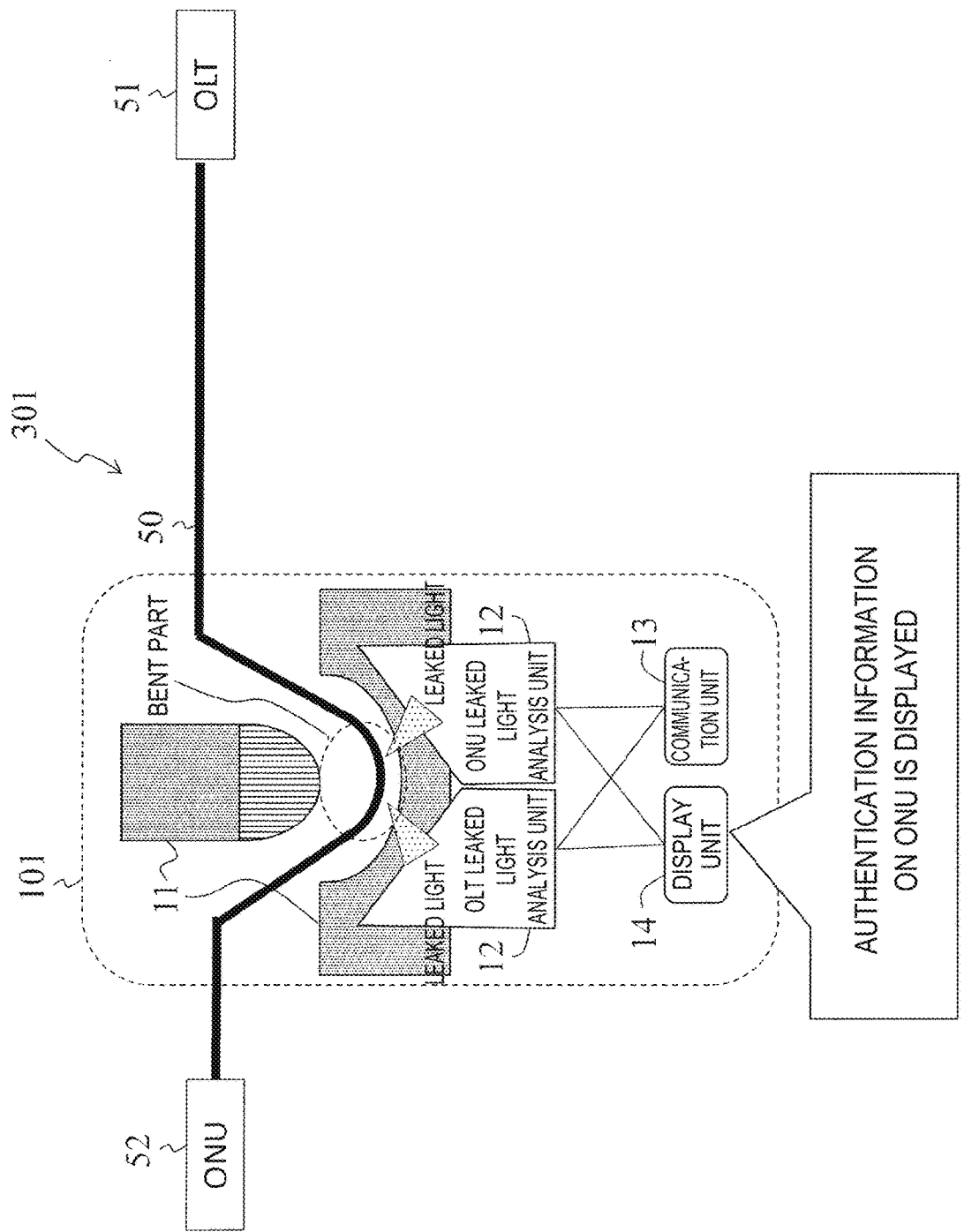
FIG. 23 is a diagram illustrating the optical fiber display system according to the present invention.

FIG. 23 is a diagram illustrating the optical fiber display system 301 according to the present embodiment. One of the analysis units 12 of each core wire identification terminal 101 acquires authentication information transmitted from the communication apparatus (ONU 52), included in the leaked optical signal, and the display unit 14 displays the acquired authentication information together with the acquired identification numbers of the communication apparatuses and the received identification number of the optical fiber 50.

In the optical fiber changeover construction, disconnection and connection of the optical fiber are repeated; however, it is necessary to start communication between the OLT 51 and the ONU 52 by the newly installed optical fiber after the changeover. Normally, when the OLT 51 and the ONU 52 communicate with each other, the authentication information is included in an uplink optical signal of the ONU 52. Therefore, the communication is not started, and the changeover construction is not completed unless the authentication information is acquired.

In the present embodiment, in the confirmation step, the authentication information from the ONU is acquired, and each of the core wire identification terminals 101 confirms the authentication information. As illustrated in FIG. 23, each of the core wire identification terminals 101 can not only acquire the MAC addresses by bending the optical fiber 50 but also acquire the authentication information included in the optical signal of the ONU 52 on the construction site. In other words, the optical fiber display system 301 can acquire proof that the communication is restarted on the changeover construction site.

Embodiment 7

Figure 24:
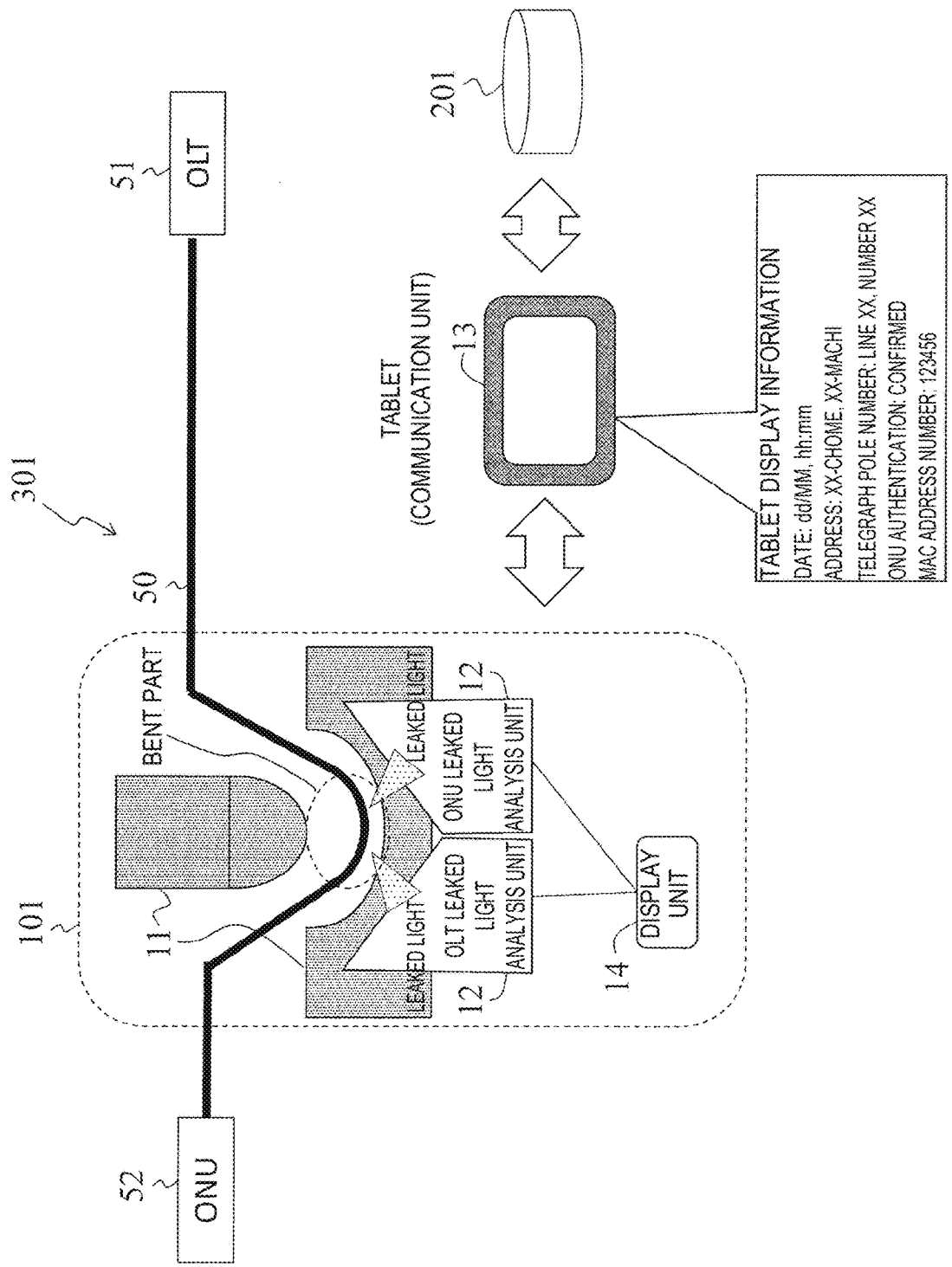
FIG. 24 is a diagram illustrating the optical fiber display system according to the present invention.

FIG. 24 is a diagram illustrating the optical fiber display system 301 according to the present embodiment. The communication unit 13 of each of the core wire identification terminals 101 transmits, to the database 201, a correction signal to correct the relationship between the optical fiber and the communication apparatuses, stored in the database 201. In the present embodiment, a registration step of registering, in the database, the information on the position where the existing optical fiber is disconnected in the disconnection step, and the identification numbers of the communication apparatuses and the authentication information acquired in the confirmation step, is further performed.

For example, as illustrated in FIG. 24, the MAC address and the authentication information on the ONU 52 can be acquired at the same time through analysis of the leaked light. Together with the information, a confirmation date, the place of the construction by the GPS function, and a telegraph pole number in which the optical fiber is installed can be displayed on each of the tablets. In other words, it is possible to collectively display when and where communication from which ONU 52 (MAC address) has been recovered, and to confirm these information on the construction site in real time.

Each of the tablets registers the information in the database 201. When the information is registered in the database 201, the changeover construction of the corresponding optical fiber is completed.

In the related art, the workers take the data acquired on the site back to an office, and manually input and register the data in the database. Further, the workers may not clearly remember the construction contents because of lapse of time after the construction. Using the system enables registration on the construction site.

REFERENCE SIGNS LIST

11 Bent part formation unit
12 Analysis unit
13 Communication unit
14 Display unit
50 Optical fiber
51 OLT
52 ONU
101 Core wire identification terminal
201 Database
301 Optical fiber display system

The invention claimed is:

1. An optical fiber display system comprising a plurality of core wire identification terminals, wherein each of the core wire identification terminals includes:
   bent part formation units configured to form a bent part at an optional position of an optical fiber and to leak optical signals propagating through the optical fiber from the bent part;
   analysis units configured to acquire identification numbers of communication apparatuses included in the leaked optical signals, the communication apparatuses being connected to respective ends of the optical fiber;
   a communication unit configured to inquire of a database storing relationship between the optical fiber and the communication apparatuses about the acquired identification numbers of the communication apparatuses, and to receive an identification number of the optical fiber corresponding to the acquired identification numbers of the communication apparatuses, from the database; and
   a display unit configured to display the acquired identification numbers of the communication apparatuses and the received identification number of the optical fiber.

2. The optical fiber display system according to claim 1, wherein
   each of the core wire identification terminals further includes a positional information acquisition unit configured to grasp a position of an own terminal,
   the communication units of the respective core wire identification terminals mutually notify the identification numbers of the communication apparatuses, the identification number of the optical fiber, and the grasped own position, and the display unit of each of the core wire identification terminals also displays the identification numbers of the communication apparatuses, the identification number of the optical fiber, and the position of another core wire identification terminal that are notified from the other core wire identification terminal.

3. The optical fiber display system according to claim 1, wherein in a case where the leaked optical signals disappear, the analysis units cause the display unit to hide the identification numbers of the communication apparatuses, and in a case where the disappeared optical signals are leaked again, the analysis units cause the communication unit to perform inquiry again, cause the communication unit to receive the identification number of the optical fiber corresponding to newly acquired identification numbers of the communication apparatuses, from the database, and cause the display unit to display the newly acquired identification numbers of the communication apparatuses and the received identification number of the optical fiber.

4. The optical fiber display system according to claim 1, wherein the analysis units acquire authentication information transmitted from the communication apparatuses, included in the leaked optical signals, and the display unit displays the acquired authentication information together with the acquired identification numbers of the communication apparatuses and the received identification number of the optical fiber.

5. The optical fiber display system according to claim 1, wherein the communication unit transmits, to the database, a correction signal to correct the relationship between the optical fiber and the communication apparatuses, stored in the database.

6. An optical fiber changeover method of changing over a partial section of an optical fiber from an existing optical fiber to a newly installed optical fiber in an optical access network in which an optical line terminal (OLT) and an optical network unit (ONU) are connected by the optical fiber, the optical fiber changeover method comprising:

a specification step of specifying the existing optical fiber to be changed over, by acquiring identification numbers of the OLT and the ONU as communication apparatuses by using core wire identification terminals at both ends of the partial section, inquiring of a database storing relationship among the optical fiber, the OLT, and the ONU about the acquired identification numbers of the communication apparatuses, and confirming, in the core wire identification terminals, that an identification number of the optical fiber corresponding to the acquired identification numbers of the communication apparatuses is coincident with an identification number of the existing optical fiber to be changed over;

a disconnection step of disconnecting the existing optical fiber by first disconnecting an end of the existing optical fiber on the ONU side out of both ends of the partial section, and disconnecting an end of the existing optical fiber on the OLT side after the identification number of the ONU as the communication apparatus is hidden in the core wire identification terminal on the OLT side;

an information update step of updating information in the database by rewriting the identification number of the optical fiber in the database from the identification number of the existing optical fiber to an identification number of the newly installed optical fiber;

a connection step of connecting the newly installed optical fiber by first connecting an end of the newly installed optical fiber on the OLT side out of both ends of the partial section, and connecting an end of the newly installed optical fiber on the ONU side after the identification number of the OLT as the communication apparatus is displayed on the core wire identification terminal on the OLT side; and a confirmation step performed after the newly installed optical fiber is connected, by acquiring the identification numbers of the OLT and the ONU as the communication apparatuses by using the core wire identification terminals at both ends of the partial section, inquiring of the database about the acquired identification numbers of the communication apparatuses, and confirming, in the core wire identification terminals, the acquired identification numbers of the communication apparatuses and the identification number of the optical fiber corresponding to the acquired identification numbers of the communication apparatuses.

7. The optical fiber changeover method according to claim 6, wherein, in the confirmation step, authentication information from the ONU is also acquired and confirmed in the core wire identification terminals.

8. The optical fiber changeover method according to claim 7, further comprising a registration step of registering completion of an optical fiber changeover work in the database, by registering information on a position where the existing optical fiber is disconnected in the disconnection step and the identification numbers and the authentication information on the communication apparatuses acquired in the confirmation step, in the database.

* * * * *